UNITED STATES PATENT OFFICE.

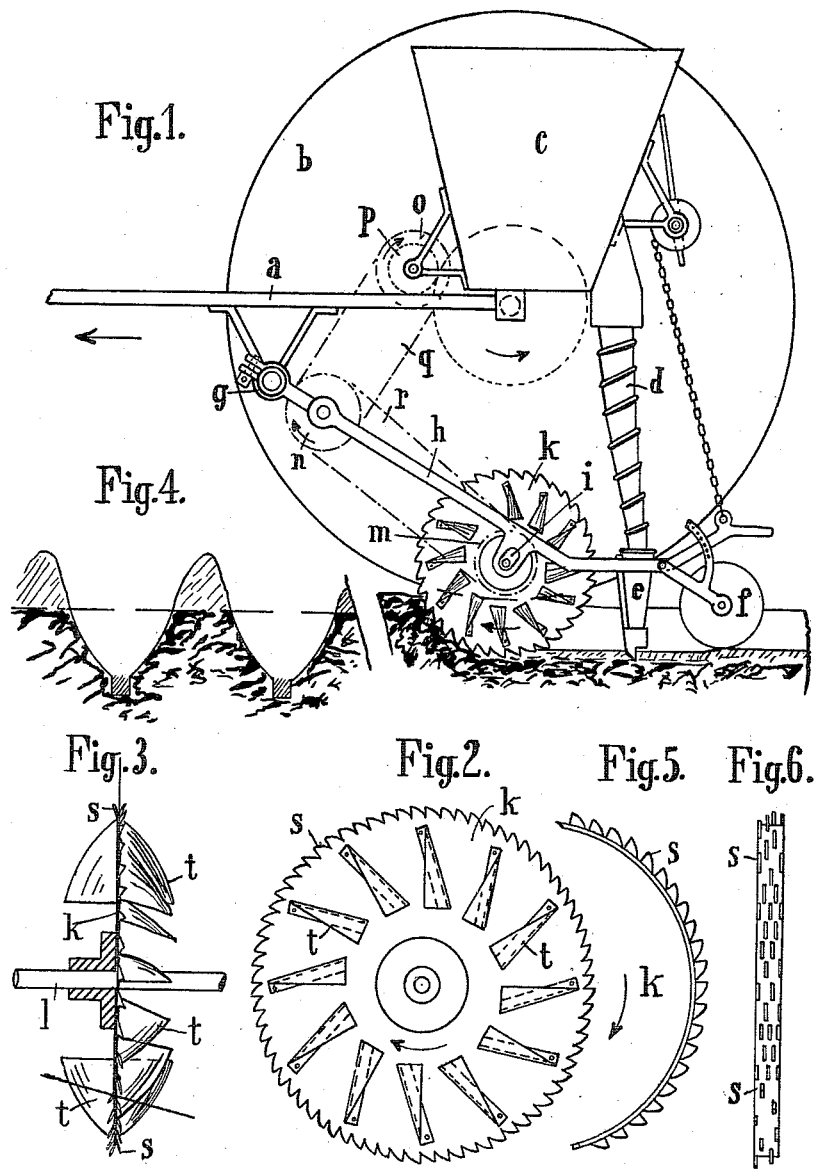

WILHELM MEISSNER, OF MAGDEBURG, GERMANY.

RIDGE-DRILL.

994,707. Specification of Letters Patent. Patented June 6, 1911.

Application filed December 13, 1909. Serial No. 532,917.

*To all whom it may concern:*

Be it known that I, WILHELM MEISSNER, a subject of the King of Prussia, German Emperor, and resident of Magdeburg, Germany, have invented certain new and useful Improvements in Ridge-Drills, of which the following is a specification.

This invention relates to a ridge-drill the the construction of which is improved in such a manner that the seeds are embedded in the earth in a particular manner and so that the crop becomes more plentiful than with the ridge-drills of known construction.

The ridge-drills of known construction make furrows in the earth which, after the seeds have dropped in, are covered, the earth being compressed afterward by means of a pressing roller. With the improved ridge-drill according to this invention however, smooth open furrows are formed in front of the sowing plow or conducting tube, the latter running along the bottom of the furrow and depositing the grains into the earth, a roller pressing the grains lightly into the earth. The earth having been made loose before the sowing plow or conducting tube penetrates into the earth, the grains are embedded at equal and uniform depth in the earth, wherefrom follows a uniform growth of the stalks. This advantage is particularly valuable for beet-roots or sugar-beet.

In the accompanying drawings the improved ridge-drill is shown.

Figure 1 represents the improved ridge-drill in side elevation with the near wheel removed. Fig. 2 shows in side elevation and on a larger scale the principal part of the improved machine, the furrow-disk Fig. 3 represents said furrow-disk in section at the left hand part and in front elevation at the right hand part. Fig. 4 shows the furrows in cross section which have been made by the improved ridge-drill. Fig. 5 shows in side elevation part of the crown of a disk destined to loosen the earth. Fig. 6 is a front view of Fig. 5.

The main parts of the ridge-drill frame are the same as generally employed and they consist of the frame $a$ having the wheels $b$, the seed reservoir $c$, the conduits $d$ for the seed, the sowing or furrow opening share $e$ with its pressure roller $f$, and the drag bar $h$ which is fixed by means of a clamping device $g$ on a pivoted cross bar and supports the sowing or furrow opening share $e$. This movable drag bar $h$ carries in adjustable bearings $i$ in front of said sowing or furrow opening share $e$ a disk $k$ which is keyed on an axle. This axle is revolved from one of the wheels $b$ of the machine by means of a chain- and chain-wheel transmission gear $m$, $n$, $o$, $p$, $q$, $r$ in the direction of the arrows, that is to say in a direction opposite to that in which the machine advances.

The disk $k$ has teeth $s$ which are either oblique as shown in Fig. 3 or arranged in series as shown in Fig. 6 and serve for loosening the earth at a uniform depth and width. The disk $k$ further presents knives or shares $t$ which stand at an angle with the radii of the disk so that they throw the earth forward and sideward but never in upward direction. Thus an absolutely smooth furrow is obtained which has smooth and comparatively solid sides, so that the earth does not drop into the furrow. As can be seen from Figs. 1 and 4 the earth is of different density.

The improved ridge-drill operates as follows:—The share-disk $k$ makes a furrow which shows a small regular ridge of square cross section of the bottom and irregular heaps of earth at the sides. The sowing or planting share deposits the seed in the bottom furrow and the roller $f$ presses the grains lightly into the earth.

Having now particularly described the nature of my said invention and in what manner the same is to be performed I declare that what I claim is:—

1. In a ridge drill the combination with the usual sowing or furrow opening share, of a revoluble disk mounted in front of said sowing or furrow opening share for digging the furrow, teeth at the periphery of said disk arranged in series for loosening the earth at a uniform depth and width, and shares mounted radially on said disk and at such an angle that they throw the earth only forward and sideward, and means for operating said digging disk from the driving parts of the ridge drill, substantially as described and shown and for the purpose set forth.

2. In a ridge drill the combination with the usual sowing or furrow opening share, of a revoluble disk mounted in front of said sowing or furrow opening share for digging the furrow, oblique teeth at the periphery of said disk for loosening the earth at a uniform depth and width, and shares mounted radially on said disk and at such an angle that they throw the earth only forward and sideward, and a chain and chain wheel transmission gear for revolving said digging disk from one of the
5 wheels of the machine, substantially as described and shown and for the purpose set forth.

In witness whereof I have hereunto set my hand in the presence of two witnesses.

WILHELM MEISSNER.

Witnesses:
ERICK VETERS,
JEAN N. ODEMAR.

Copies of this patent may be obtained for five cents each, by addressing the "Commissioner of Patents, Washington, D. C."